United States Patent [19]

Speros

[11] Patent Number: 4,719,968
[45] Date of Patent: Jan. 19, 1988

[54] HEAT EXCHANGER

[76] Inventor: Phillip C. Speros, 10293 Prouty Rd., Painesville, Ohio 44077

[21] Appl. No.: 755,619

[22] Filed: Jul. 16, 1985

Related U.S. Application Data

[60] Continuation-in-part of Ser. No. 607,416, May 7, 1984, abandoned, which is a division of Ser. No. 438,767, Nov. 11, 1982, Pat. No. 4,459,976, which is a continuation-in-part of Ser. No. 225,254, Jan. 15, 1981, abandoned.

[51] Int. Cl.$^4$ .............................................. F28F 21/00
[52] U.S. Cl. ...................................... 165/154; 165/165; 165/905; 165/907
[58] Field of Search ................. 165/165, 154, 905, 907

[56] References Cited

U.S. PATENT DOCUMENTS 3,732,919  5/1973  Wilson ................................ 165/166
3,933,195  1/1976  St. Clair ........................ 165/DIG. 8

Primary Examiner—Albert W. Davis, Jr
Attorney, Agent, or Firm—Pearne, Gordon, McCoy & Granger

[57] ABSTRACT

A heat exchanger unit comprising a particulate heat exchanging mass or pack consisting of relatively small, mechanically immobilized particles having a thermal diffusivity constant of at least 0.5 cm$^2$/sec at 20° C., and compressively retained in an enclosure in heat transfer relationship to each other and to a fluid directed therethrough. Preferred materials for the particles are crystalline carbon, copper and aluminum. The pack may be in cylindrical form or planar form and may be contained within metal conduits or, for solar radiation, within a transparent or translucent enclosure. Interconnected units may be disposed in an array or bank to provide the desired quantitive degree of thermal transfer.

15 Claims, 10 Drawing Figures

HEAT EXCHANGER

This application is a continuation-in-part of my co-pending application, Ser. No. 607,416, filed May 7, 1984 and now abandoned, which is a division of my copending application Ser. No. 438,767 filed Nov. 11, 1982 (now U.S. Pat. No. 4,459,976), which is a continuation-in-part of my prior copending application Ser. No. 225,254, filed Jan. 15, 1981 and now abandoned.

BACKGROUND OF THE INVENTION

The rate of heat transfer in a heat exchanger is a function of several factors, regardless of whether the exchanger is for cooling purposes, for heating purposes, for transfer between fluids, or for collection and transfer of radiant energy. The rate of heat transfer is determinative of the efficiency, as well as the level or quality of performance of the heat exchanger for its intended purpose.

The conversion of radiant energy to heat involves the absorption of as many wave lengths of the radiation as possible by a black (or grey) body and transfer of heat from the black body to a working fluid such as water or air.

The rate of heat conduction, $dQ/dt$, from the transfer body of a heat exchanger to the working fluid is governed by the equation:

$$\frac{dQ}{dt} = K \frac{A}{L} (T_a - T_f) \quad (1)$$

where Q is energy units, t is time, K is the limiting heat conductivity constant of either the fluid or the exchanger body, whichever is less, A/L is a fraction in which A is the area of contact between the transfer body and fluid and L is the length or distance between the hot surface of the heat absorbing and exchanging material and the coolest or median portion of the adjacent body of working fluid $T_a$ is the temperature of the contact surface of the transfer body, and $T_f$ is the temperature of the fluid at the aforesaid median portion. The fraction A/L is of particular interest in connection with the present application.

Specifically for a given value of $T_a - T_f$, K is a constant characteristic of the fluid, and therefore the rate of conduction, $dQ/dt$ is directly proportional to A/L. Consequently, a main objective of heat exchanger design is to make A as large as possible and L as small as possible. This has resulted in elaborate tubular flow arrangements, a common example being the conventional automobile radiator. In the usual case, when water or air is the working fluid, K is small and the heat exchangers rely not only on conduction, but also on natural or forced convection of the fluids to induce heat transfer.

A common feature or element of such heat exchangers is illustrated schematically in FIG. 1 of the accompanying drawings which are part of the present application, and in which the fluid is made to circulate within a metallic tube or conduit 1 which is attached to the surface of a metallic member or fin 2. Heat exchange, in this instance, depends on conduction of heat to or from the fluid to the surface of the transfer member or fin 2. It will be understood that, for industrial use, many hundreds or thousands of such tubes would be utilized. When such an exchanger is used as a solar collector, the surfaces facing the sun are made black by painting, oxidizing, etc. Thermal insulation for such an exchanger from its surroundings is provided by one or more transparent covers 3, 4, and a backing 5.

Another prior art form of tubular heat exchanger is schematically illustrated in FIG. 2 of the drawings. In this form, the heat transfer takes place between fluids circulating in the inner conduit 6 and the coaxial outer conduit 7. When this form is used as a solar collector, the working fluid circulates within a blackened inner conduit 6, made of metal, which is placed within a transparent tube 7, the space between the conduit 6 and tube 7 being evacuated to reduce heat loss by conduction and convection.

Typically, the radii of tubes used in solar collectors are of the order of 1 cm. Therefore, A amounts to approximately 6 $cm^2$ for each lineal centimeter of tube. Since L is approximately 1 cm, A/L is 6 cm per unit length of tube.

The art has also addressed itself to non-metallic heat exchangers or solar collectors. Representative of the current state of the art is the recently issued Rice et al. U.S. Pat. No. 4,310,747 and the prior art Harvey U.S. Pat. Nos. 4,082,082 and 4,129,117.

Rice et al. disclose a heat transfer device in which the heat source is either an electrical resistance element or, alternatively, solar energy, or possibly both in combination. The same heat exchanging material is utilized for both sources of energy and consists of a baked, skeletal, porous, vitreous carbon structure containing multi-directional, interconnected carbon strands having electrical continuity. The starting material for this skeletal network is a flexible polyurethane resin reticulate structure which is transformed into non-crystalline amorphous carbon. Rice et al. describe this porous body as having a density of about 0.05 g/cc. Inasmuch as amorphous carbon has a density of about 2.0 g/cc, it is evident that the composite body is highly porous and would have a ratio of carbon to space (or flow passages) on the order of 1:40, providing a relatively small carbon mass and contact area for heat transfer contact with the working fluid although, conversely, providing a relatively large area of flow passageways for the fluid.

It is also to be noted that vitreous amorphous carbon such as utilized by Rice et al. not only has significant electrical resistivity to achieve the patentee's objective of providing an electrical resistance heating element, but also has a relatively low value of thermal diffusivity or conductivity on the order of $1.0 \times 10^{-3}$ $cm^2$/sec, which is significantly lower than the thermal diffusivity of the metals, such as copper, used in tubular heat exchangers, which is on the order of 1.0 $cm^2$/sec.

The two Harvey patents disclose a solar collector utilizing a particulate of fibrous, blackened exchanging material which is characterized by the patentee as having "high solar energy absorption and low thermal diffusivity (e.g., preferably below $2.5 \times 10^{-3}$ $cm^2$/sec)." A variety of materials are listed, with carbon-filled, high density polyethylene being a preferred example. The particle size is described as a mean diameter in the range of 1 to 10 mm, preferably 3 to 4 mm. The particles are deliberately loosely packed to permit them to move or circulate freely in response to flow of the working fluid, presumably to permit sequential exposure of the particles to the unidirectional solar radiation, as they are not packed to be thermally conductive with each other.

Neither Harvey nor Rice et al. disclose any performance data for their solar collectors, but both mandate very low values of thermal conductivity for the absorber material, as this characteristic is necessary to achieve the result the patentees seek. In Harvey, low thermal diffusivity of the particles is desirable to localize heat absorption at the surface of the moving particles and increase the exposed particle skin temperature by inhibiting heat transfer to the interior of the particle. In Rice, very low thermal diffusivity is taught to achieve a carbon strand having high electrical resistivity for resistance heating.

The prior art tubular metal heat exchangers, particularly those used industrially or in chemical processing, utilize solid metal heat exchange bodies which have relatively high thermal diffusivity, but are unduly restricted in area of contact with the working fluid by reason of mechanical design limitations.

The prior art non-metallic collector of the Harvey patents attempts to enhance the area of heat transfer contact by the use of carbon-containing particles for the heat exchange medium, but deems it necessary and desirable to sacrifice good thermal diffusivity to do so. The same is true of the more recent Rice disclosure. Both of these disclosures could have limited usefulness in intermittent, low-demand situations where a low rate of heat transfer is acceptable and adequate, as for supplementary hot water heating for home use.

The present invention is directed to overcoming the limitations of prior art heat exchangers, both the metallic tubular and non-metallic, by significant and radical improvement of the rate of heat transfer, particularly in the continuous, high-demand industrial and nuclear applications.

SUMMARY OF THE INVENTION

The invention has as its primary object the provision of a heat exchanger which radically enhances the rate of heat transfer, and achieves improved efficiency.

Another object of the invention is to provide a heat exchanger of the character described which has high constancy or consistency, i.e., maintenance of uniformly high efficiency under all operating conditions.

Another object of the invention is to provide a heat exchanger of the character described which, per unit of mass or size, has a significantly improved response to energy input, i.e., low "thermal inertia."

Another object of the invention is to provide a heat exchanger of the character described which is lower in cost than exchangers of the prior art.

A further object of the invention is to provide a heat exchanger of the character described, which is highly durable, can be operated virtually free of maintenance costs and utilizes durable materials, such as glass and elemental carbon, in its construction.

A further object of the invention is to provide a heat exchanger of the character described which is of simple construction and which embodies system simplification, i.e., elimination of other components, such as additional heat exchangers and regulating equipment in an overall heating system.

A still further object of the invention is to provide a heat exchanger of the character described in which the use of additives such as anti-freeze, corrosion inhibitors, etc. is eliminated.

The foregoing objectives are attained by a novel thermodynamic concept which achieves unexpectedly great increases in the rate of heat transfer by means of a structure which combines enhancement of both the contact transfer area and the thermal conductivity of the heat exchanger unit, with improved intimacy of contact in the heat transfer function.

Other objects, advantages, and novel features of the invention will become apparent from the following description of the invention when considered in conjunction with the accompanying drawings.

BRIEF DESCRIPTION OF THE DRAWINGS

The present invention may be bether understood and the numerous objects and advantages thereof will become apparent to those skilled in the art by reference to the accompanying drawings, in which.

DESCRIPTION OF THE PREFERRED EMBODIMENTS OF THE INVENTION

Figure 3:
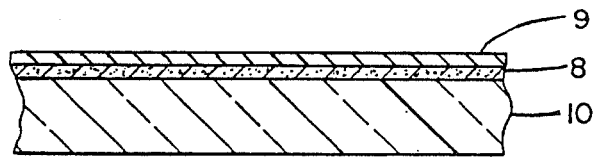
FIG. 3 is a schematic or diagrammatic illustration of a heat exchanger embodying one form of the invention.

Referring more particularly to FIG. 3 of the drawings, there is shown a thin radiation-absorbing layer 8 composed of particles of crystalline carbon having relatively high thermal diffusivity, preferably graphite, compressed or packed between a radiation-transmitting cover 9, such as tempered glass, and an insulation backing 10 of glass or other rigid insulating material. The surface 9 is adapted to be exposed to solar radiation.

In assembly, the layer 8 is subjected to pressure sufficient to immobilize the particles at the operating conditions to which it will be subjected, as well as to maintain the particles in thermally-conductive contact with each other. For example, if the unit is to be used for water at ordinary house pressure, a particle pack pressure of about 100 lbs/sq. in. would be used; or if higher operating pressures or forces are anticipated, the pack pressure would be increased to a value sufficient to prevent movement of the particles relative to each other at such higher working fluid forces.

The mean diameter of the particles is in the range of 750 microns down to about 50 microns, with 500 microns mean diameter being a preferred maximum. The objective is to use particles which are as small as practicable commensurate with the maintenance of ample fluid passageway interstices and with the maintenance of discrete particles at the pack pressure values to which the particles are subjected. The working fluid, such as water, flows through the spaces between the non-contacting portions of the particles of the layer 8.

The mean diameter of the particles for a water temperature range of up to 25° C. using normal municipal water pressure is in the range of 750 microns down to about 50 microns, with 500 microns mean diameter being a preferred maximum. The objective is to use particles which are as small as practicable commensurate with the maintenance of ample fluid passageway interstices and with the maintenance of discrete particles at the pack pressure values to which the particles are subjected. The working fluid, such as water, flows through the space between the non-contacting portions of the particles.

The optimum particle size of 750 microns down to about 50 microns produces the higher efficiencies in accordance with the invention using fluid pressures within reasonable design limits for the equipment. The objective is to select a particle size no greater than that necessary to provide interstitial fluid passageways with sufficient size to permit the required fluid velocity at pressures well within the practical design limits of the equipment. In any event, the fluid velocity obtained must be adequate to maintain the temperature of the fluid within design limits.

In some heat transfer applications where relatively high temperatures are present, the fluid passageway interstices through a pack of particles of the aforesaid optimum size are too small to accommodate the design flow rate under operating pressure, such as where it is necessary to keep the fluid below its boiling point if no phase change is desired. An increase in pressure is often not practical since it could exceed the design limits of the equipment. In the event the fluid temperature does inadvertently exceed the boiling point, an explosion could occur.

Accordingly, in these instances, heat transfer rates may have to be sacrificed to some extent in order to utilize the method and apparatus of the invention. The desired trade-off between faster flow rate and optimum heat transfer is accomplished by using particles of a somewhat larger mean diameter but still within a range that produces the advantages of the invention.

The pressure used must be great enough and the fluid selected must have properties such that the particles used have a mean diameter of no more than about 1500 microns in order to obtain the full advantages of the invention. In some instances, it may be desirable to have a phase change in the heat exchange device, such as in the case of a freon gas generator. In some such devices, water at a moderate temperature is used as the thermal energy source, and in order to achieve an adequate rate of heat transfer from the water to the liquid freon to produce a phase change, a relatively high flow rate is necessary. In such a case, a compromise must be reached between optimum heat transfer rate on the water side, and flow rate. Accordingly, a particle size of between 750 and 1500 microns may be necessary to achieve the required flow rate using available water pressure.

Another application of the invention where a phase change is utilized is in nuclear power generating stations where super-heated steam generated by thermal energy from a nuclear reactor must be cooled in a heat exchanger by secondary water. The flow rate of the secondary cooling water (that is subsequently exhausted into rivers, lakes, etc.) must be sufficiently high to condense the steam at a rate commensurate with the prevailing operating conditions. Here again, a larger than optimum particle size may be necessary to achieve the required flow rate at the expense of maximum heat transfer efficiency.

The particles, in addition to functioning as heat absorbers, serve as excellent thermal conductors. This thermal conductivity extends throughout the particle mass by reason of the pressure contact maintained between all particles. The thermal conductivity or diffusivity of graphite in the basal crystallographic plane is about 1.0 $cm^2$/sec, which is of the same magnitude as that of the heat exchanger conduit metals, such as copper or aluminum, which are conventionally considered most desirable from a practical and economic standpoint. The heat diffusivity constant is preferably at least 0.8 $cm^2$/sec at 20° C., but should not be less than 0.5 $cm^2$/sec at 20° C. to achieve the objectives of the invention.

The surface area of the particles is typically 1 to 40 $m^2$ per gram, depending on the particle size selected within the given range. For an overall (projected) surface area of collector of 1 $cm^2$ and a particle layer thickness of 0.1 to 0.4 cm, typically containing on the order of 0.1 grams of graphite particles, the surface area of particles in direct contact with the fluid, and therefore the value A in the equation, is then on the order of $10^3$ to $10^4$ $cm^2$, while L, which is herein the average locus of the adjacent fluid between the small particles, is of the order of a few microns or $10^{-3}$ to $10^{-4}$ cm. Regardless of the particular particle size selected within the given size range, the maximum value of L is one-half the mean diameter of the particle.

Accordingly, the value of the critical factor A/L in the foregoing equation (1) for the described embodiment is on the order of $10^6$ to $10^8$ cm. This unexpectedly high value is a resultant of the several factors previously mentioned: (a) the particle size of the graphite transfer material is small, so as to establish an extremely high ratio of exposed surface area to mass: (b) the particles are immobilized and packed to maintain contact with each other throughout the mass, despite the pressures or forces of fluid flow which would otherwise tend to disrupt this interparticle continuity of contact; (c) the fluid-filled spaces or interstices between contiguous particles are of very small magnitude, so that the distance from the heat transfer surface of any particles to the median point or locus of the immediately adjacent body of fluid in contact therewith, which defines L in the equation (1), is correspondingly of very small value; (d) the thermal diffusivity of the graphite pack is relatively high, thus transferring and conducting the absorbed input heat to all particles throughout the particle pack, even though only some of the particles are directly exposed to the radiation energy; and, consequently (e) all of the surface area of all of the particles presents an effective area of heat transfer contact with the fluid passing through the small passageways of the particle pack, thus significantly increasing the value of A in the equation (1) beyond that which would exist if only the surfaces of those particles directly exposed to and heated by the radiation energy were operatively effective for heat transfer to the adjacent fluid.

Inasmuch as the value of K in the equation (1) is the heat conductivity constant of water in all the comparative analyses herein made, and the value of (Ta−Tf) is only variable within relatively narrow limits, the rate of heat transfer, represented by dQ/dt, is influenced almost entirely by the quantity A/L. The corresponding value dQ/dt is of the order of $10^6$ to $10^8$·K·cal/cm$^2$·sec based upon the foregoing values, when Ta−Tf is 1° C. and where K is the established heat diffusivity constant of water at the attained temperature of the transfer fluid. This compares to a heat transfer rate of 6·K·cal/cm$^2$·sec for the copper tube heat exchanger of FIG. 1 or FIG. 2, using tubes of 2 cm internal diameter for purposes of calculation, so that L would have a value of 1 cm. The value of K would be the same in both instances. The heat transfer rate for a prior art copper tube cluster of extremely small individual internal diameter, e.g., 5 mm, might be as great as 1000 K·cal/cm$^2$·sec.

It also compares to a calculated heat transfer rate of 0.1 to 10·O·K·cal/cm$^2$·sec for the non-metallic solar collector of Harvey or Rice et al., taking into account the limited area of hot exchanger surfaces for heat transfer in both of these disclosures.

It can be conservatively stated that the inventive embodiment hereinabove described has, in many instances, a heat transfer rate at least 1000 times greater than that of the most efficient prior art tubular metallic heat exchangers and at least 100,000 times greater than that of the Harvey or Rice disclosures. Thus, the inventive embodiment has such a high rate of heat transfer that it appears to transfer heat instantaneously, when compared to the other known forms of heat exchangers above described.

The basic embodiment of FIG. 3 lends itself readily to many configurations and applications, as will be presently explained, with special emphasis on those which can be assembled readily from commonly available durable materials.

Figures 2, 4A:
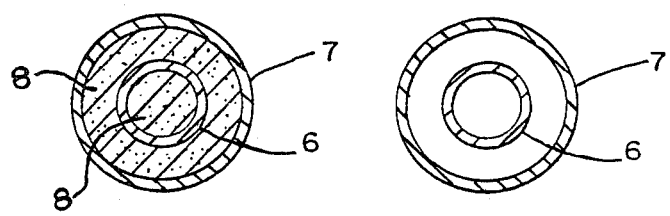
FIG. 2 is a schematic or diagrammatic illustration of another form of tubular metallic heat exchanger representative of the prior art.
FIG. 4A is a schematic or diagrammatic illustration of a heat exchanger embodying the invention in a modified form of the prior art tubular exchanger of FIGS. 1 or 2.
Figure 4:
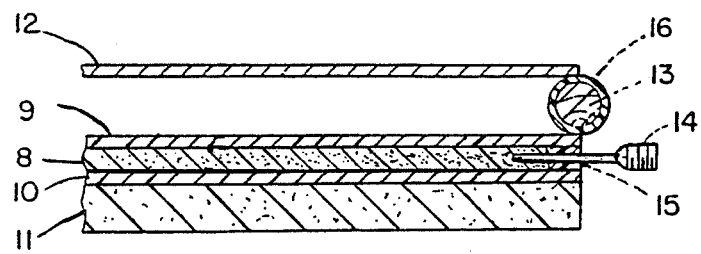
FIG. 4 is a schematic or diagrammatic illustration of a heat exchanger embodying a modified form of the invention of FIG. 3.

Referring more particularly to FIG. 4, a flat plate solar collector is shown which, although it is not optimized with respect to construction and represents a minimum of performance, proved to fulfill all of the objectives of the invention which have hereinabove been stated.

In FIG. 4, reference numeral 8 designates a thin layer of graphite particles tightly packed between a cover 9 and a backing 10, the cover and backing being made of tempered glass panels approximately 20 inches long, 7 inches wide, and 3/16 inch thick.

In assembling the aforesaid structure, a thin bead of black silicone sealant 15 was applied to the marginal edges of three sides of the panel 10. At each corner, a small object of desired thickness, such as a piece of a copper coin or a copper sphere, as for example a BB gun pellet, was embedded in the silicone bead in order to establish the spacing between the panels.

The cover panel 9 was then attached by pressing it down upon the silicone bead and the assembly was left to cure overnight.

The graphite particles 8 were available as recovered scrap from graphite electrode manufacturers, or as commercial products intended for a variety of purposes. These graphite particles were screened for a size of 500 microns mean diameter, washed with a degreasing liquid such as acetone, and then poured into the space between the panels 9 and 10 and packed in place by applied pressure. The marginal edges of the fourth side of the panels were then sealed with silicone sealant.

Alternatively, particularly when higher particle pack compression is desired, the sealant 15 is applied to all four marginal edges of the panel 10; the cover panel 9 is attached, using it as a platen for the desired pressure to be imposed on the contained particle pack, while, at the same time, using any form of suitable fixture or rigid retaining frame around the periphery of the assembly to prevent escape of the sealant; and then permitting the sealant to cure.

Inlet and outlet tubes for the fluid should consist of corrosion-resistant materials, preferably glass or synthetic resin. In this instance, however, these were provided by inserting through the cured silicone sealant 15 air needles 14 such as commonly used for inflating footballs and which, in turn, were connected to input and output polyethylene tubing (not shown).

A backing 11 of insulating material was provided consisting of a sheet of polystyrene foam approximately ½ inch thick and spot-glued to the back of the back panel 10 by means of a few drops of silicone sealant.

A rectangular frame consisting of hardwood dowel stock 13, ⅜ inch in diameter and coated with silicone 16, was attached to the panel 9 and a transparent cover 12 of insulating material was attached to the silicone coating 16 of the frame 13, the silicone serving both as a preservative coating for the frame and as a sealant between the frame and the covers 12 and 9.

The distance between the panels 9 and 10 was approximately 0.4 cm.

Figure 5:
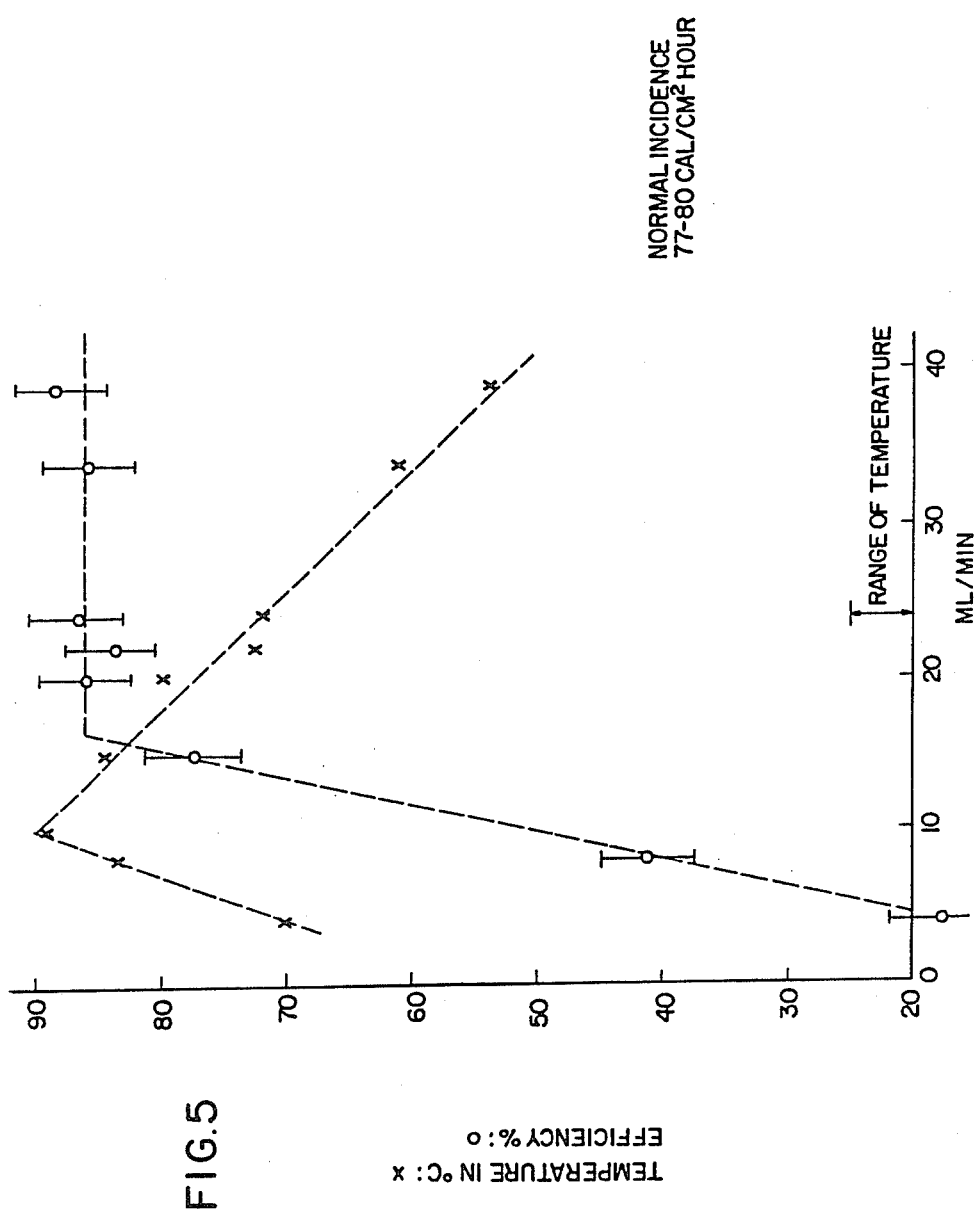
FIG. 5 is a graph showing the performance of the device of FIG. 4 of the present invention as a function of the rate of water flow in ml/min at solar incidence normal to the device surface and amounting to 77–80 calories per square centimeter per hour, and illustrates maintenance of constant high efficiency of heat transfer over a broad range of flow rates.
Figure 6:
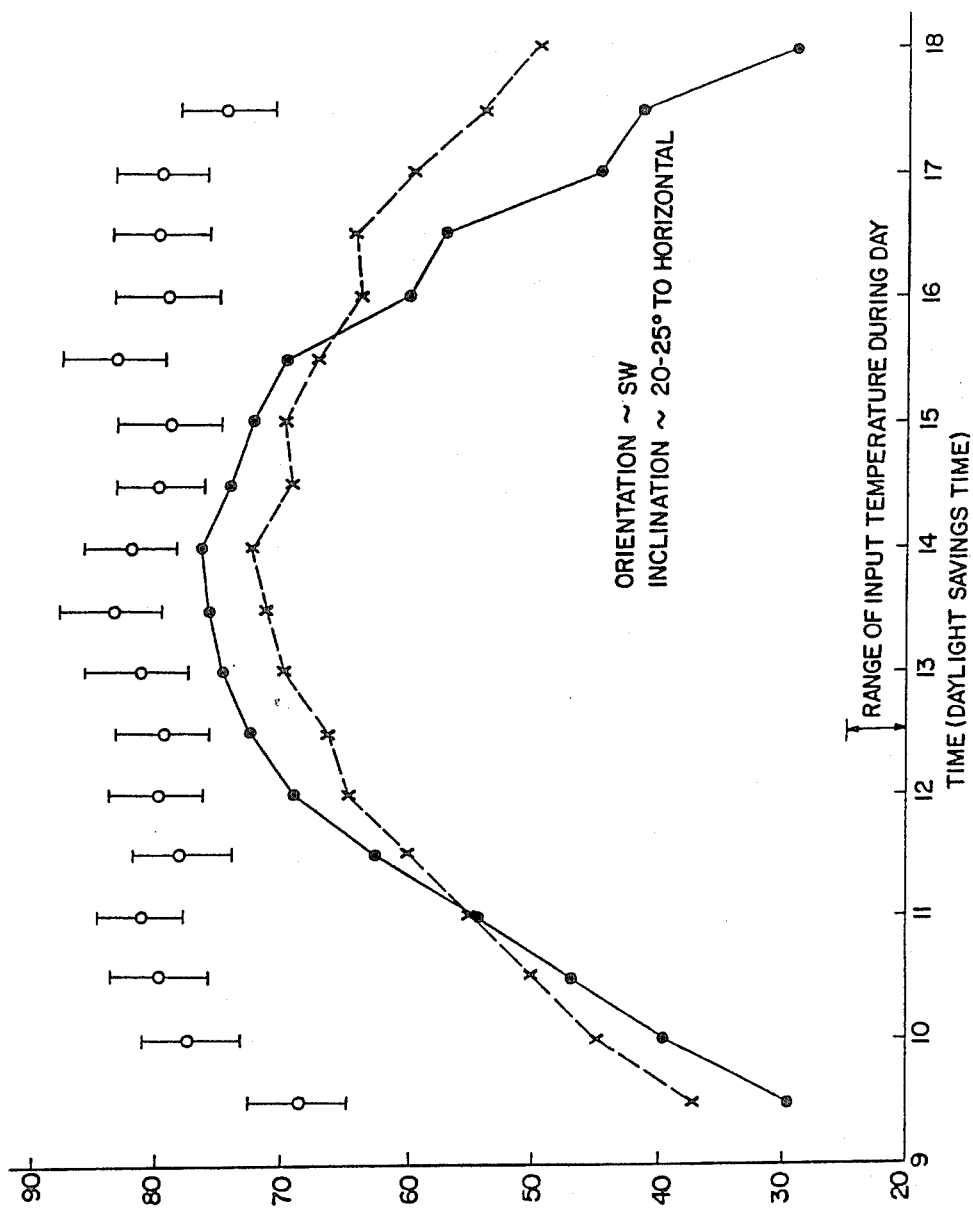
FIG. 6 is a graph showing the behavior of the device of FIG. 4 of the present invention under typical working conditions over an entire day at constant collector orientation and constant water flow, and indicates the uniformity of heat transfer efficiency at varying heat input values.
Figure 7:
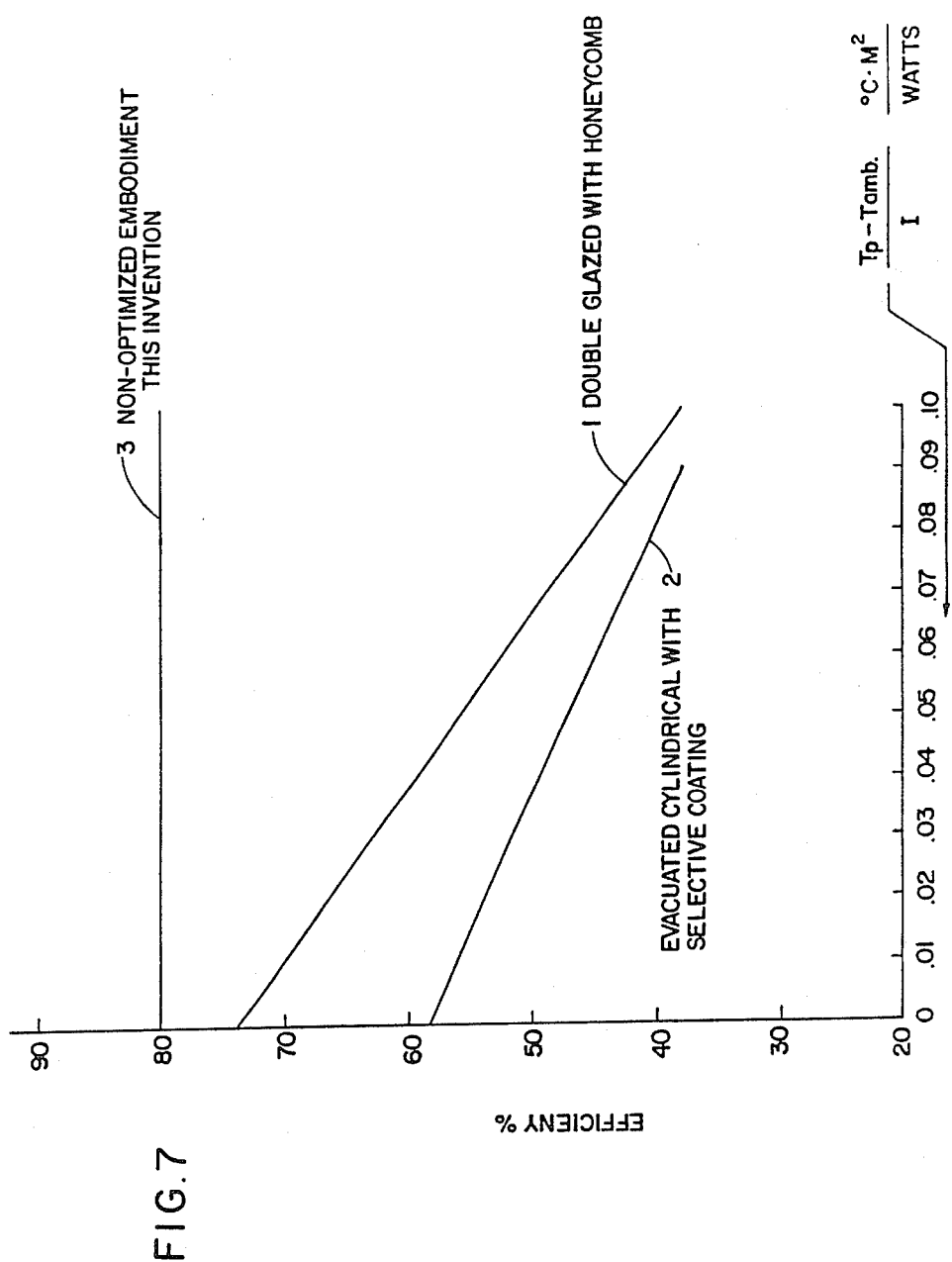
FIG. 7 is a graph showing the performance of the device of FIG. 4 of this invention as compared to the performance indicated by curves 1 and 2 in FIG. 7, under conditions of varying fluid flow rate and varying energy input.

The performance characteristic of the embodiment shown in FIG. 4 in comparison with the prior art is graphically depicted in FIGS. 5, 6, and 7 of the drawings.

The test data in FIGS. 5, 6, and 7 was obtained by using water as the fluid. The water was contained in a reservoir approximately 1 meter higher than the collector, and the water flow was controlled or adjusted by means of a common stop-cock or valve. The inlet and outlet water temperatures were measured with mercury thermometers, as were the temperatures of the panel 10 and the cover 12.

The incident solar energy was measured at the plane of the collector by placing on cover panel 12 a calibrated solar meter (Dodge Products, Houston, Tex., Model 776). The area of the collector was measured and found to be approximately 860 cm$^2$.

FIG. 5 shows the performance of the collector as a function of the rate of water flow in ml/min at solar incidence normal to the collector surface and amounting to 77–80 cal/cm$^2$ hour. It is seen that the efficiency, calculated as:

$$\text{Efficiency} = \frac{(\text{ml/hr})(\text{Temp. output} - \text{Temp. input}) \times 100}{\text{cal/860 cm}^2 \text{ hour}} \qquad (2)$$

rises rapidly to 80% at the minimum design flow rate of approximately 15 ml/min and remains substantially constant thereafter in a broad range of flow rates within the experimental error indicated by the error bars. This is in marked contrast to the behavior of typical collectors of the prior art in which the efficiency is maximum at zero flow and decreases continuously thereafter (see FIG. 7). The initially low percentage of efficiency below the design limit of 15 ml/min is due to the fact that at these low flow rates the water is not distributed over the entire surface of the collector but prefers to follow clearly visible random channels. In applications where such relatively slow flow rates are sufficient, channeling can be prevented by the use of smaller graphite particles and/or a thinner layer of graphite.

It is further seen in FIG. 5 that in this model, temperatures approaching 90° C. can be obtained, and the design temperature of 60° C. (household hot water temperature) can be obtained under these conditions at 30 ml/min.

FIG. 6 shows the behavior under typical working conditions over an entire day at constant collector orientation and constant water flow.

The collector was oriented parallel to the house roof facing southwest at an inclination to the horizontal plane of 20–25 degrees. The flow rate was set at 19–20 ml/min and monitored continuously.

The test data in FIG. 6 demonstrates that collector efficiency is substantially constant also with varying angles of solar incidence, and therefore with the amount of solar energy incident on the collector, as plotted, except at times of extremely low angles of incidence, namely at 0900 and 1800 hours. The irregularities in the temperature and incident solar energy curves after 1530 hours are due to intermittent cloudiness occurring after this time.

It is noted that the efficiency is less than 100%. It was determined, by measuring the incident solar energy with and without panels 9 and 12 in front of the solar meter, that this reduction in efficiency is due almost entirely to reflection-absorption by the panels. This is rather surprising because, normally, appreciable loss is caused by convection-conduction to the surroundings from the hot collector. Apparently, this is minimized in this collector by the thin configuration of the heat-exchanging absorber, and this is corroborated by the fact that the efficiency does not vary with the temperature of the collector, as seen in FIGS. 5 and 6.

In scientific and technical literature, it is customary to express the characteristic performance of the collectors by plotting efficiency on the ordinate versus the fraction $$T_f - T_A/I \tag{3}$$

on the abscissa, where
$T_F$ = fluid outlet temperature ° C.
$T_a$ = fluid inlet temperature ° C.
$I$ = rate of solar energy input in watts/m$^2$
resulting in efficiency expressed as a function of ° C.·m$^2$/W. Such plots are then used in order to compare various collectors as in FIG. 7.

In order to compare the collector of this invention with those of the prior art, authoritative plots of this kind are used and reproduced in FIG. 7. These were obtained for well known commercial collectors by the National Bureau of Standards and published in *Solar Energy*, volume 18, page 421 (1976). Further work on comparing collectors by means of these plots is described in the same issue of that journal, page 451, by NASA Lewis Research Center.

Figure 1:
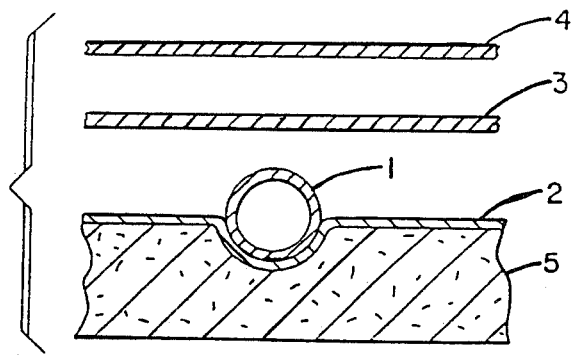
FIG. 1 is a schematic or diagrammatic illustration of a tubular metallic heat exchanger representative of the prior art.

In FIG. 7, the best performance is reported in the above-mentioned publications for (a) a two-cover glass collector with a Mylar honeycomb insert, curve 1 in FIG. 1 representing an elaboration of FIG. 1 in this disclosure, and (b) an evacuated cylindrical collector with a selective coated absorber, curve 2 in FIG. 7 representing an elaboration of FIG. 2 in this disclosure.

Numerous publications and advertisements since 1976 (not reproduced in FIG. 7) show little if any improvement over those of curves 1 and 2 in FIG. 7.

In comparison with the performance indicated by curves 1 and 2, the performance of the collector of FIG. 4, curve 3 in FIG. 7, shows two striking differences: (1) the efficiency is substantially constant and (2) the efficiency is substantially higher.

Another unit or model similar to the one described above was placed in the freezer compartment of a household refrigerator after it had been filled with water and exposed to the sun. The water froze but there was no cracking or other damage to the unit. Apparently, the elasticity of the silicone sealant and/or the flat glass panel is adequate to allow sufficient expansion to accommodate the increase of volume of water upon freezing. Therefore, for this collector, it will not be necessary to use an antifreeze, as is necessary to collectors of the prior art.

Various modifications may be made in the collectors described above, as indicated in the following examples.

For example, the tempered glass for these units was high in iron content (green glass). Using iron-free tempered glass will increase transmission to approximately 90%.

The backing 11 of the collector can be made of concrete foam, as disclosed in applicant's U.S. Pat. No. 4,267,021 on solar desalination. This should eliminate the need for using less durable insulation, such as that made of organic materials.

The life of the silicone sealant was found to be between 5 and 10 years. The front and back panels can be joined by fusing a glass shim on the panels in order to eliminate the organic sealant.

These units can be joined together to constitute part of the house roof, instead of resting on the shingles.

The cover 12 can be a common surface for all of the units instead of being attached to each individual unit. The distance between the covers 9 and 12 can be optimized, as taught in U.S. Pat. No. 4,267,021, to which reference has been made above.

The heat exchangers or collectors of the present invention render possible the elimination of other heat exchangers and equipment used therewith.

The water pressure in solar collectors of the prior art is much lower than that of normal city water pressure. The heated water is circulated by a pump through the collector and then down to a heat exchanger immersed in the hot water tank of the house. It was found that the embodiments or model of the present invention was described above will withstand normal city water pressure (exceeding 40 lbs/in$^2$ in the locale of the residence of the applicant) if they are clamped at the edges by U-shaped aluminum alloy conduits. This makes it unnecessary to use the additional heat exchanger. If it is necessary to use glass of lesser thickness than the 3/16 inch thick glass used here, the backing of these units can be made to be the top of a thin metallic box, also filled with graphite particles, through which the high pressure city water can circulate with efficient heat exchange occurring between the low pressure water in the collector and the high pressure water in the lower metallic box. Finally, if it becomes necessary to retain the heat exchanger in the hot water tank, this heat exchanger can be identical with the metallic box described above, but operating in series with the collector, i.e., containing the heating water at the reduced pressure.

Instead of glass members 9 and 10 as in FIG. 4, porous firebrick could be used, the surfaces of which are made impermeable by a coating of appropriate cements. The cement coating facing the sun is made black by incorporating in it common cement plus a dye or carbon black. In this case, although the fraction A/L of equation (1) is still very large, the value of K for the firebrick is low and the "thermal inertia" of the system is also very large. Such an embodiment serves the function of thermal storage because once the system is heated, it remains hot for days. Alternatively, or additionally, the water heated by embodiments such as that of FIG. 4 can be conducted to and circulated through a bed of porous firebrick which thus functions as a means of storing heat for extended periods of time, e.g., weeks.

Heat exchanger configurations of the tubular metallic type, such as shown in FIGS. 1 and 2 for example, also lend themselves to radical improvement in the rate of heat transfer through use of my inventive concept. Instead of using the conventional approach of utilizing the interior of conduit 1 or conduit 6 solely as a fluid passageway, these passageways are packed with particulate graphite in particle sizes and at packing pressures in the range previously discussed. This structure provides a thermally conductive mass within the conduit whose thermal diffusivity is of substantially the same magnitude as the copper or aluminum in which it is encased in heat transfer contact. This heat exchanger mass provides a significantly larger area of heat transfer contact between the particles and the fluid passing through the mass, as well as a multiplicity of minute flow channels to direct the fluid into intimate contact with adjacent heat transfer particles.

As a consequence, the value of the quantity A in the equation (1) is greatly enlarged and the value of the quantity L is greatly diminished to enlarge the value of A/L. This often results in a rate of heat transfer at least 1000 times greater than could be obtained without the introduction of the particles in the flow conduit.

Similarly, the annular space between conduits 6 and 7 of FIG. 2 is packed with graphite particles having a thermal diffusivity which is of comparable magnitude to that of the encasing metal tube. Such an arrangement further improves the rate of heat transfer through the counter-flow fluid passing through the annular space, for the reasons above mentioned.

The use of small diameter tube sizes in heat exchangers has been considered desirable primarily to enhance the area of heat transfer contact with the fluid. Inasmuch as the packed particles can be relied upon for that desirable characteristic, it is no longer necessary for excellent and improved heat transfer to minimize the metal conduit diameters. These diameters can be enlarged to accommodate the desired rate of fluid flow through the particle pack, without doing any noticeable injury to the radical and unexpected improvement obtained in the rate of heat transfer and inefficiency.

Further experimentation has indicated that while the preferred particle size range of from 750 microns down to about 50 microns mean diameter is not always practical in view of flow rate considerations, in some instances, there must be a trade-off between the maximum heat transfer rate (which is a function of particle size) and required flow rate (at available design pressure) which is often dictated by design considerations.

Figure 8:
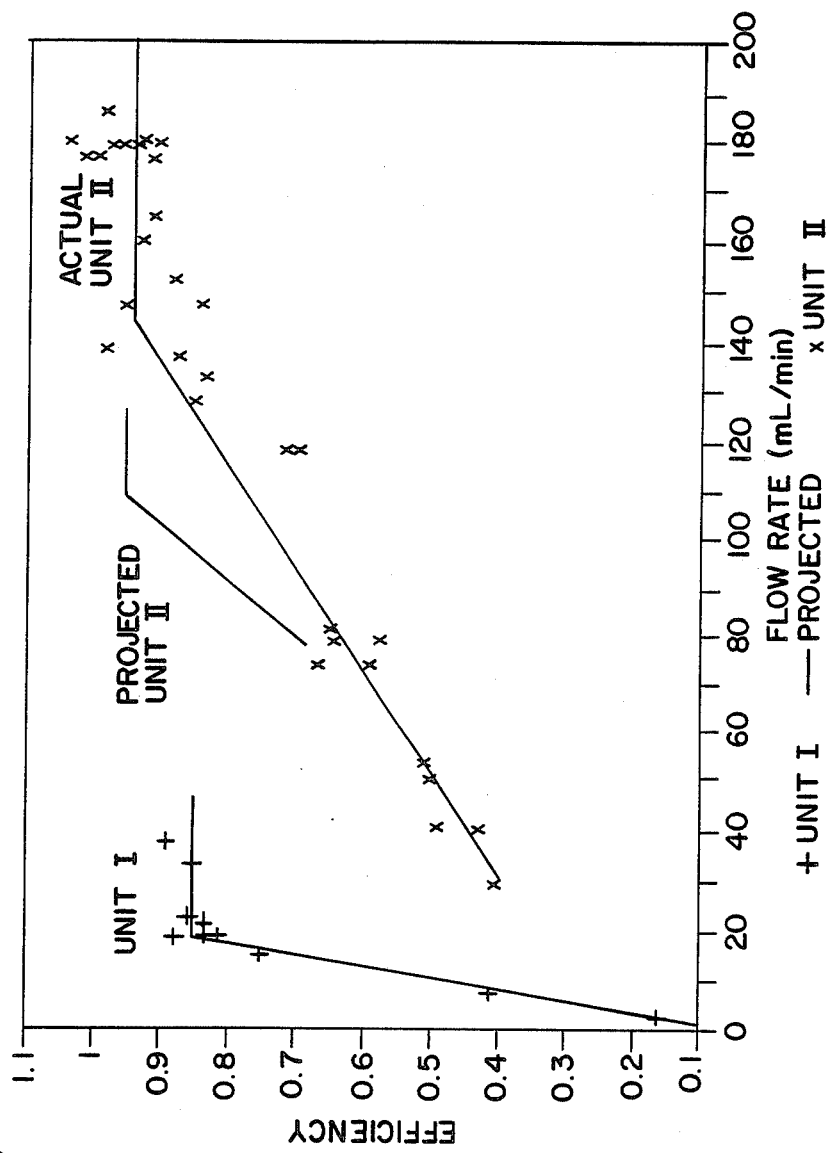
FIG. 8 is a graph similar to FIG. 5 comparing the performance of the device of FIG. 5 with a device approximately five times its size and illustrating the unexpected results achieved as compared with those predicted from factors relating to scale.

FIG. 8 compares the efficiency data obtained from the device tested to produce the curves shown in FIG. 5 with another test device constructed in accordance with the invention but which was about 5.5 times as large. The curve to the left reflects the data obtained using the first device (Unit I) and represents, on a different scale, the same results shown in FIG. 5. Optimum efficiency was achieved at a flow rate of about 18 ml/min. The efficiency level was 85 percent.

The second device (Unit II) was constructed in the same manner, but was 5.5 times as large. Preliminary testing indicated a higher efficiency level than the 85 percent obtained from Unit I and the new level in fact as about 94 percent. Accordingly, the projected flow rate of the second unit (Unit II) would be expected to be $[(18\times5.5)+(18\times(0.94-0.85)\times5.5)]$, or 110 ml/min at the point at which the new maximum efficiency of 94 percent is attained. This projected performance curve is shown near the middle of the chart of FIG. 8. At this projected optimum flow rate, Unit II would be expected to have enough fluid passing through to remove the thermal energy input at an optimum efficiency.

Contrary to this projection, however, the test data deviated significantly, in that the flow rate required to attain maximum efficiency was considerably higher (i.e., about 145 ml/min, rather than about 110 ml/min). The curve resulting from the test data for Unit II is plotted in FIG. 8.

Accordingly, in some instances, the device of the invention requires higher flow rates than were previously expected. This would dictate a trade-off between optimum particle size (for maximum heat transfer) and increased flow rate. This larger particle size (i.e., a mean diameter up to about 1500 microns) may sometimes be desirable in order to achieve the required flow rate (at design pressure) to reach maximum efficiency.

Figure 9:
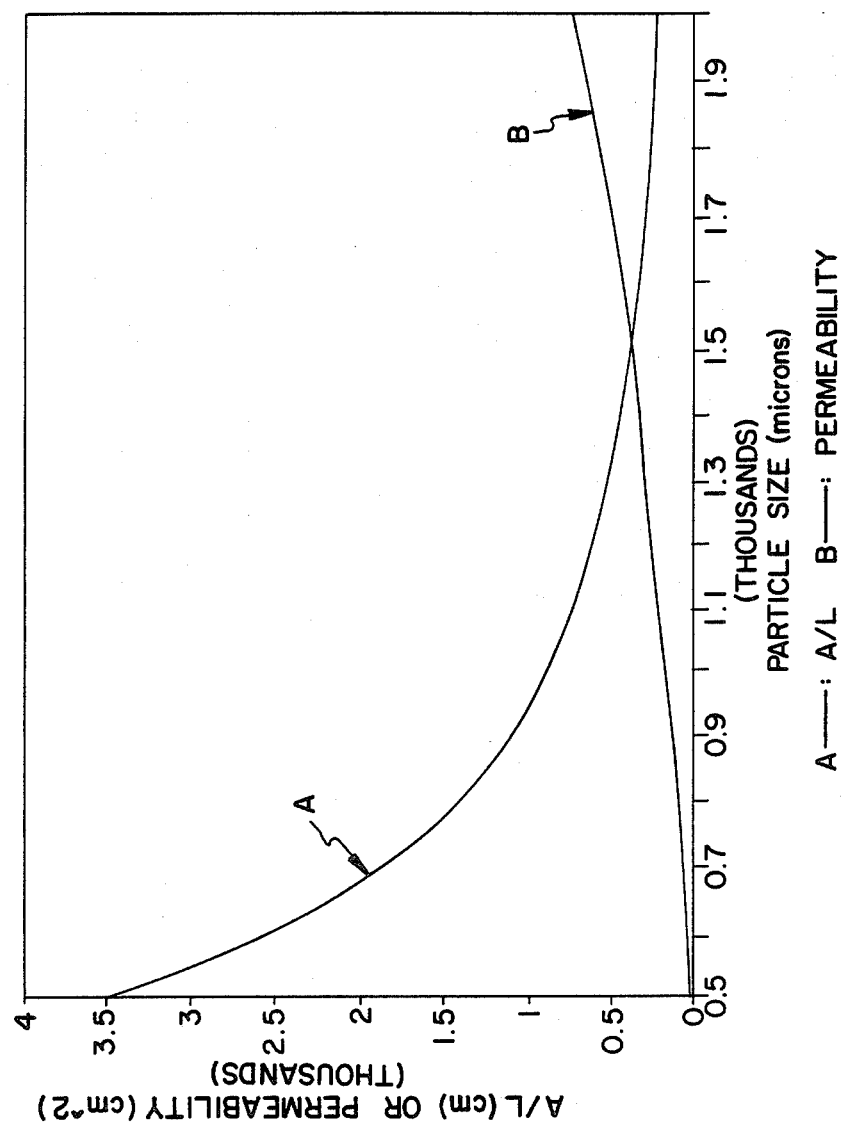
FIG. 9 is a graph showing the relationship between particle size and the A/L value (a determinative of heat transfer rate) and pack permeability which is determinative of the obtainable flow rate.

FIG. 9 is a chart that reflects the relationship between particle size and flow rate. With particle sizes within the optimum range for heat transfer, i.e., from 750 down to 50 microns (mean diameter), the permeability is relatively low and the A/L ratio is quite high, as is desired. This range is, of course, the best for many applications. Curve A is a plot of the A/L ratio as a function of particle size.

Curve B is a plot of permeability (i.e., flow rate) as a function of particle size, and it will be seen that permeability is about four times as great at a particle size of 1500 microns or at 750 microns. Accordingly, particle sizes of between 750 and 1500 microns (mean diameter) may be necessary in some applications where high flow rates are required. At particle sizes substantially about 1500 microns, the A/L ratio decreases below the level at which the unique advantages of the invention can be obtained.

In FIG. 9, the A/L ratios were calculated based on a hexagonal, close-packed geometry of spheres. A more realistic particle shape will provide a curve near but above the one shown. This is because the spherical shape has the lowest possible area-per-volume ratio. A more irregular shape will have more area for the same mass. Therefore, curve A of FIG. 9 represents the minimum boundary for A/L values in a device of this type.

Curve B reflects a modified Darcy equation describing the velocity of a fluid through a porous medium. The equation is as follows:

$$V = -\frac{K}{\mu}\left(\frac{dp}{dx} - \rho g \cos \theta\right)$$

where
  $K = \delta^2 g/32$
  $\delta$ = the average pore size
  $g$ = the effective porosity
  $\rho g \cos \theta$ = the gravitational force
  $dp/dx$ = the pressure drop
  $\mu$ = a viscosity coefficient.

The viscosity coefficient is a commonly referred to parameter reported, for example, in the ASME Steam Table. The pore diameter is the largest circle that can be placed without overlap on the open cross section of a hexagonal, close-packed arrangement. Since the modified Darcy equation calls for the velocity to be directly proportional to K (as well as the prevailing fluid pressure), K is plotted as a function of particle diameter to generate curve B of FIG. 9.

The conclusion from this analysis is that in a device of the invention designed for a particular application, the particles selected should have a mean diameter no greater than necessary to provide interstitial fluid passageways with sufficient size (i.e., permeability) to permit a fluid velocity at design pressure that is adequate to maintain the temperature of the fluid at that level at which optimum operation is achieved.

In those applications where corrosion is not a significant problem, metallic particles such as copper or aluminum may be utilized instead of and in the same manner as described above for graphite, to achieve improved results of the same magnitude. There also may be circumstances where the graphite and the metal particles are desirably used in combination. For convenience and simplicity, the foregoing disclosure has been directed principally to solar heat exchangers or collectors, but it is to be understood that the invention is not limited to radiant or solar energy heat exchange, but is adapted for general use in heat exchangers for fluids utilizing conduction and/or convection heat input or output, as well as radiation. Banks or arrays of multiple interconnected units may be utilized to achieve the quantitative result desired. These may include units in physical heat transfer contact, as well as units interconnected by fluid flow lines.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. In a heat exchanger, the combination of a heat transfer pack consisting of compressed discrete particles of radiation energy-absorbing solid matter having a mean diameter of no more than about 750 microns and having a thermal diffusivity constant of at least 0.5 cm²/sec at 20° C., said particles being immobilized relatively to each other by a pack pressure sufficient to maintain said particles in physical and thermally-conductive contact with each other during operating conditions, said particles providing a plurality of interstitial fluid passageways through said pack, and an enclosure for retaining said particles in heat transfer contact with a fluid directed through said pack.

2. A combination as defined in claim 1, in which said pack is substantially cylindrical in form.

3. A combination as defined in claim 1, in which said pack is substantially planar in form.

4. A combination as defined in claim 1, in which said solid matter is selected from the group consisting of crystalline carbon and metals.

5. A combination as defined in claim 4, in which said enclosure is a tubular conduit.

6. A combination as defined in claim 4, in which said enclosure is a first conduit containing a first heat transfer pack and at least a second conduit coaxial with said first conduit and containing a second heat transfer pack.

7. A combination as defined in claim 4, in which said carbon is in the form of graphite and said metals are aluminum and copper.

8. A combination as defined in claim 1, where the quantity A/L in the equation (1) herein has a value of at least $1 \times 10^5$ cm for said heat transfer pack.

9. A combination as defined in claim 1, wherein said particles are maintained at a pack pressure greater than the pressure of the fluid flowing through said pack.

10. A combination as defined in claim 9, wherein said pack pressure is at least 40 lbs./in².

11. In a heat exchanger for transferring heat energy from a first fluid to a second fluid, the combination of:
  a first heat transfer pack;
  a second heat transfer pack in heat transfer relation to said first pack;
  each of said packs consisting of compressed discrete particles of radiation energy-absorbing solid matter having a thermal diffusivity constant of at least 0.5 cm²/sec at 20° C., said particles being immobilized relatively to each other by a pack pressure sufficient to maintain said particles in physical and thermally-conductive contact with each other during operating conditions, said particles providing a plurality of interstitial fluid passageways through said pack, the average locus of said fluid passageways between said particles having a maximum value no greater than one-half the particle size mean diameter, said particles having a mean diameter of no more than about 750 microns;
  a first enclosure for retaining said particles of said first pack in heat transfer contact with said first fluid as it is directed through said first pack; and
  a second enclosure for retaining said particles of said second pack in heat transfer contact with said second fluid as it is directed through said second pack;
  whereby heat energy transferred from said first fluid to said first pack is transferred to said second pack and thence to said second fluid.

12. The method of improving the rate of heat transfer in a fluid heat exchanger, comprising the steps of:
  (a) packing the fluid passageway of said heat exchanger with minute discrete particles of radiation energy-absorbing solid material having a mean diameter of no more than about 750 microns and having a thermal diffusivity constant of at least 0.5 cm$^2$/sec at 20° C.;

(b) maintaining said particles at a pack pressure sufficient to immobilize said particles in physical and thermally-conductive contact with each other during fluid flow;

(c) maintaining said particles in heat transfer contact with each other; and (d) providing a multiplicity of new interstitial fluid passageways through said packed particles for heat transfer contact of the fluid with said particles.

13. The method as defined in claim 12, wherein the average locus of said fluid passageways between said particles has a maximum value no greater than one-half the particle size mean diameter.

14. In a heat exchanger, the combination of a heat transfer pack consisting of discrete particles of heat-energy-absorbing solid matter having a thermal diffusivity constant of at least 0.5 cm$^2$/sec at 20° C., said particles being immobilized relatively to each other by a pack pressure sufficient to maintain said particles in physical and thermally-conductive contact with each other during operating conditions, said particles providing a plurality of interstitial fluid passageways through said pack, and a rigid enclosure for retaining said particles in heat transfer contact with a fluid directed through said pack, said particles having a mean diameter no greater than necessary to provide said interstitial fluid passageways with sufficient size to permit a fluid velocity at relatively low pressure that is adequate to maintain the temperature of the fluid at a desired level to achieve optimum operating efficiency, said mean diameter being about 750 microns.

15. The method of improving the rate of heat transfer in a fluid heat exchanger having a rigid fluid passageway comprising the steps of:

(a) packing the fluid passageway of said heat exchanger with minute discrete particles of thermal energy-absorbing solid matter having a relatively high thermal diffusivity constant;

(b) maintaining said particles at a pack pressure sufficient to immobilize said particles in physical and thermally-conductive contact with each other during fluid flow;

(c) maintaining said particles in heat transfer contact with each other; and (d) providing a multiplicity of new interstitial fluid passageways through said packed particles for heat transfer contact of the fluid with said particles;

said particles having a mean diameter no greater than necessary to provide said interstitial fluid passageways with sufficient size to permit a fluid velocity at relatively low pressure that is adequate to maintain the temperature of the fluid at a desired level to achieve optimum operating efficiency, said mean diameter being about 750 microns.

* * * * *